United States Patent
McAllister et al.

(10) Patent No.: US 8,432,634 B2
(45) Date of Patent: Apr. 30, 2013

(54) IDENTIFYING ERROR BUILT INTO A MEDIUM

(75) Inventors: Jeffrey S. McAllister, Boise, ID (US);
Donald J. Fasen, Boise, ID (US);
Vernon L. Knowles, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1598 days.

(21) Appl. No.: 11/396,669

(22) Filed: Apr. 3, 2006

(65) Prior Publication Data
US 2007/0230033 A1   Oct. 4, 2007

(51) Int. Cl.
*G11B 5/584* (2006.01)
*G11B 20/20* (2006.01)

(52) U.S. Cl.
USPC .......................... 360/77.12; 360/76

(58) Field of Classification Search .................. None
See application file for complete search history.

(56) References Cited

U.S. PATENT DOCUMENTS

| | | | |
|---|---|---|---|
| 6,937,425 B2 | 8/2005 | Knowles et al. | |
| 2002/0163752 A1* | 11/2002 | Peterson | 360/76 |
| 2003/0016466 A1 | 1/2003 | Bui et al. | |
| 2003/0112545 A1 | 6/2003 | Hanson et al. | |
| 2004/0120070 A1* | 6/2004 | Ito | 360/76 |
| 2004/0218304 A1 | 11/2004 | Goker et al. | |
| 2004/0257694 A1* | 12/2004 | Knowles et al. | 360/77.12 |
| 2005/0094308 A1* | 5/2005 | Mahnad et al. | 360/77.12 |
| 2007/0097537 A1* | 5/2007 | Hoerger et al. | 360/55 |
| 2007/0121240 A1* | 5/2007 | Duran | 360/75 |

* cited by examiner

*Primary Examiner* — Andrew L Sniezek

(57) ABSTRACT

An apparatus includes plural spaced apart sensors arranged along a direction of motion of a medium, and a processing circuit to receive signals from the sensors, determine a difference of the signals, and identify an error built into the medium based on the difference.

25 Claims, 7 Drawing Sheets

IDENTIFYING ERROR BUILT INTO A MEDIUM

BACKGROUND

Various types of storage devices are available to store data for electronic devices. Examples of storage devices include tape-based storage devices, disk-based storage devices, integrated circuit (IC) storage devices, and others.

In a tape-based storage device, data is stored on plural data tracks of a storage tape, where the data tracks extend generally longitudinally along the storage tape. The reading and recording of data in the data tracks is accomplished by using tape heads, which typically include magnetic read/write heads for reading/recording data on magnetic storage tapes.

The storage tape is moved longitudinally with respect to the tape head as the recording operation or read operation proceeds. When reading from or writing to a storage tape, accurate lateral positioning of the tape head is desirable. To achieve accurate lateral positioning of the tape head, servo bands (or servo tracks) are recorded onto the storage tape. The servo bands contain servo patterns that are detectable by the tape head during read/write operations for determining the lateral position of the tape head with respect to the storage tape.

Other types of storage media also contain servo tracks, including disk-based storage media.

With new generations of storage media, storage capacities are increased by using smaller spacings between data tracks on the storage media. As a result, accurate positioning of read or write heads over data tracks of the storage media have become more difficult due to the decreased spacings between data tracks.

As spacings between data tracks become smaller, sources of positioning error of read or write heads with respect to the data tracks that were previously negligible (when used with storage media having larger spacings between data tracks) may become a source of positioning error that cannot be disregarded.

BRIEF DESCRIPTION OF THE DRAWINGS

Some embodiments of the invention are described with respect to the following figures.

DETAILED DESCRIPTION

Figure 1:
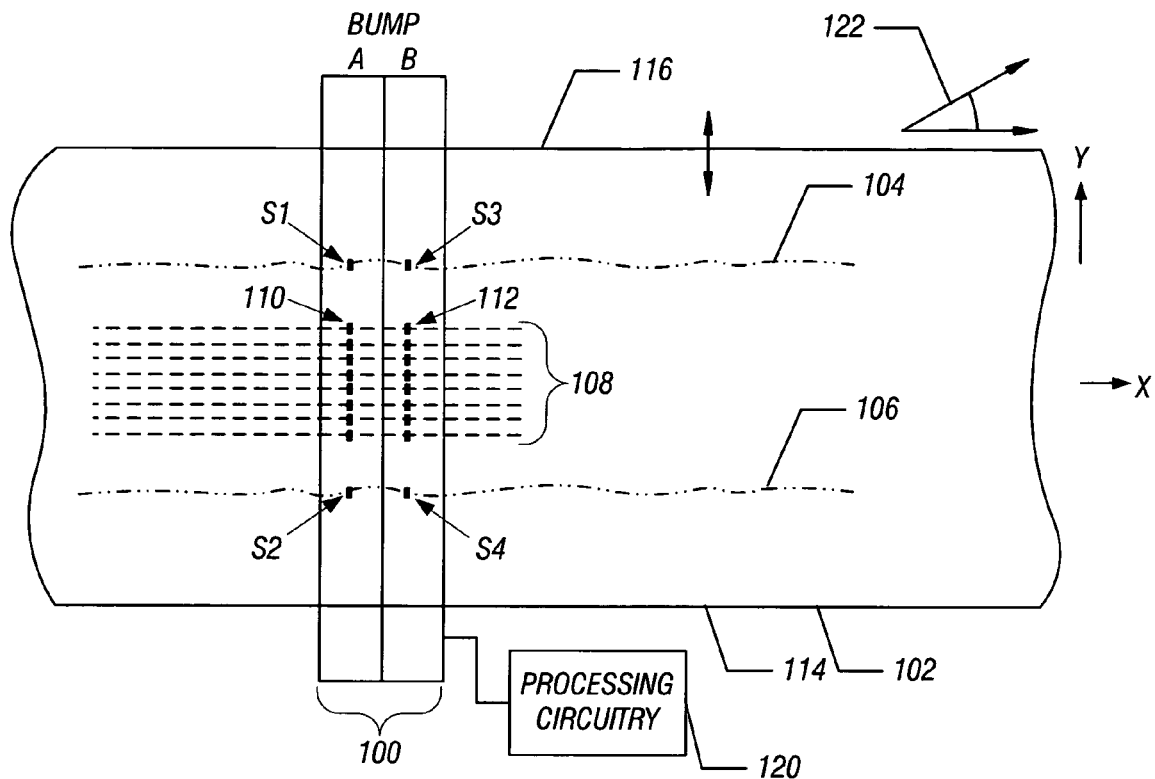
FIG. 1 illustrates a segment of a storage tape containing data tracks and servo tracks, and an access head that is coupled to processing circuitry in accordance with an embodiment.

In accordance with some embodiments, mechanisms and techniques are provided to enable the identification of errors that are built into media, such as storage media (e.g., storage tapes, disk media, and so forth). An error is built into a medium if the error is either written into the medium (such as in the form of noise written into a servo track of a storage medium), or the error is associated with a physical artifact of the medium (e.g., the edge profile of a storage tape not being straight or the medium having other types of physical anomalies). Such an error is referred to as a "built-in error." Examples of noise written into a servo track can be noise due to storage medium velocity variation during a servo write operation or due to relative lateral movement between the storage medium and servo write element during the servo write operation. A servo pattern is written into a servo track during a servo write operation.

Identification of errors built into a storage medium is useful for various purposes. In one application, the servo system of a storage medium access device (such as a tape drive, disk drive, and so forth) can remove effects of identified built-in errors when performing adjustments of positions of a storage medium access head (e.g., read head or write head). Typically, during a data write or read operation, undesirable motion of a storage medium with respect to an access head (e.g., lateral tape movement) can be present. The servo system generates a position error signal (PES) that is provided to a motor in the access device for adjusting the position of the access head, to follow the lateral storage medium movement. Built-in errors of a storage medium contaminate the position error signals provided by a servo system such that position adjustments of an access head may no longer be accurate, which can cause a data read head or data write head to no longer be centered over a target data track on the storage medium. The built-in errors of a storage medium in effect cause false motion to be detected by the servo system. Elimination of the effects of the built-in errors allows for more accurate position adjustments by a servo system.

In another application, manufacturers (such as manufacturers of storage media or manufacturers of access devices for storage media) may be interested in identifying built-in errors so that the manufacturers can characterize either the products (e.g., storage media or access devices) the manufacturers are making, or the equipment or processes used for making the products. As examples, a storage media manufacturer may be interested in knowing that noise is being written into servo tracks of storage media or that some physical artifact is being built into the storage media, so that the manufacturer can take steps to address the written-in noise or the physical artifact. As another example, an access device manufacturer may wish to remove effects of errors built into a storage medium (such as noise written into a servo track of the storage medium or errors associated with a physical artifact of the storage medium) when testing performance of access devices (e.g., tape drives, disk drives, etc.) to study the true lateral storage medium movement.

In other embodiments, identification of errors built into other types of media is also possible. For example, identification of errors built into paper may be provided, such as paper for use in printers. In the ensuing discussion, reference is made to performing identification, characterization, and/or elimination of built-in errors in storage media—note that similar techniques and mechanisms can be applied to other types of media, such as paper.

In addition to being able to identify built-in errors of a storage medium, other types of errors can also be identified by some embodiments, such as dynamic tape tilt and measurement noise. Such other errors also contribute to the position error signals produced by a servo system, so that identification of such other errors would also be useful. The ability to accurately determine contributing sources of error represented by a position error signal provides an accurate pareto of issues that are to be addressed during development (of storage media and/or access devices).

In accordance with some embodiments, a mechanism for identifying built-in errors includes plural spaced apart sensors that are arranged along a direction of motion of a medium (such as a storage medium). Processing circuitry is provided to receive signals measured by the sensors, to determine a difference of the signals, and to identify error built into the storage medium based on the difference. Examples of the sensors include servo read elements, optical sensors, or other types of sensors.

In one embodiment, the plural spaced apart sensors include two sensors that are spaced apart along a direction of motion of the storage medium. In a different embodiment, additional sensors can be provided such that three or more sensors are used. In such a different embodiment, the three or more sensors include at least two sensors spaced apart along a direction of motion of the storage medium, and at least two sensors spaced apart in a different direction. In the three-sensor example, a common sensor (sensor A) can be spaced apart in a first direction (direction of motion) from sensor B, and spaced apart in a second, different direction from a different sensor C. In the context of a storage tape, two spaced apart sensors can be arranged along the longitudinal axis of the storage tape (parallel to the direction of the motion of the storage tape), while two sensors are spaced apart along a lateral width of the storage tape.

While the use of two spaced apart sensors (along a direction of motion of a storage medium) allows for identification of errors built into the storage medium, the use of at least one more sensor (to provide three or more sensors) spaced apart along a different direction (such as laterally on a storage tape) allows for identification of other errors, including dynamic tape tilt and measurement noise. In the context of implementation in a servo system, the outputs from the at least three sensors can be processed together to more accurately adjust a position of a storage medium access head with respect to a storage medium.

FIG. 1 illustrates an example embodiment of a mechanism that includes an access head 100 having two bumps (bump A and bump B) for reading a storage tape 102. A bump of the access head 100 refers to a structure of the access head on which one or more servo read elements, data read elements, and data write elements are provided. In other embodiments, different numbers of bumps can be used (one or more than two). In yet other embodiments, bumps can be omitted.

Bump A includes two servo read elements S1 and S2 that are spaced apart along a lateral width of the storage tape 102 (along direction Y, which is generally perpendicular to the direction of motion, direction X, of the storage tape 102). The servo read element S1 is used for reading servo information in an upper servo track 104 on the storage tape 102, whereas the servo read element S2 is used for reading servo information in a lower servo track 106 on the storage tape 102. Data tracks 108 are provided on the storage tape 102 between the servo tracks 104, 106.

Bump B similarly includes two laterally spaced apart servo read elements S3 and S4, with servo read element S3 for upper servo track 104, and servo read element S4 for lower servo track 106. Effectively, servo read elements S1 and S3 (that are spaced apart along the direction of motion of the storage tape 102) are used for sensing the position of the access head 100 with respect to the upper servo track 104, while servo read elements S2 and S4 (that are spaced apart along the direction of motion of the storage tape 102) are used to sense the position of the access head 100 with respect to the lower servo track 106. The servo read elements can be magnetic sensors for reading magnetic servo patterns written onto respective servo tracks. Alternatively, the servo read elements can also be optical sensors for reading optical servo patterns written onto respective servo tracks.

In the example embodiment of FIG. 1, data write elements 110 are provided between servo elements S1 and S2 on bump A, whereas data read elements 112 are provided between servo elements S3 and S4 on bump B. In other implementations, other arrangements of servo read elements, data read elements, and data write elements can be employed.

In one example implementation, the storage tape 102 is according to the Linear Tape Open (LTO) format. In other example implementations, other formats can be used for the storage tape 102 of FIG. 1, such as the Super Digital Linear Tape (SDLT) format from Quantum Corp.

Servo read elements can also be used with other types of storage media, such as disk-based storage media. For a disk-based storage medium, the direction of motion is an angular direction of rotation (rather than the longitudinal direction of motion, direction X, for the storage tape 102).

In another embodiment, instead of using two pairs of servo read elements S1-S4 as depicted in FIG. 1, more than two pairs of servo read elements can be used, or just one pair of servo read elements can be used while still being able to identify built-in error of the storage medium. For example, in an implementation where one of the servo tracks 104, 106 is omitted, either the pair of servo read elements S1, S3 or the pair of servo read elements S2, S4 can be omitted, such that just two servo read elements spaced apart along the longitudinal direction of the storage tape 102 (direction X) are used. In the following discussion, focus is first made on usage involving two servo elements spaced apart along a direction of motion of a storage medium (which is the longitudinal direction for a storage tape, but an angular rotational direction for a disk-based storage medium).

In alternative embodiments, instead of servo read elements for reading servo tracks on a storage medium, other types of sensors can be used, where such other types of sensors measure other characteristics of the storage medium under consideration. For example, such other types of sensors can include optical sensors that are aligned with the first or second side edge (114 or 116, respectively) of the storage tape 102 to measure the profile of the respective edge of the storage tape 102. The side edge 114 or 116 is generally parallel to the direction of motion of the storage tape 102.

A storage tape is typically cut using some cutting technique, such as laser etching, scribing, rotating die cutting, and so forth. The equipment used to perform the cutting may have defects or may experience anomalies during the cutting operation such that uneven cutting occurs to cause an edge (first or second edge, or both) of the storage tape 102 to not be straight. This physical artifact of the storage tape 102 may cause errors in lateral positioning of the access head 100. During a read or write operation, the storage tape 102 may be guided by flanged rollers (not shown). If the edge(s) of the storage tape 102 has some non-straight shape (such as a sine wave shape or other shape), then the interaction between the non-straight edge(s) of the storage tape 102 and the roller flanges will cause corresponding lateral motion of the storage tape 102.

In accordance with some embodiments, processing circuitry 120 is provided to receive signals measured by the servo read elements (two or more servo read elements). The signals received by the processing circuitry 120 contain contributions from various sources of errors, including built-in error of the storage tape 102. Other sources of error include dynamic tape tilt, which is tilt of the tape 102 that varies as the storage tape 102 passes the head 100. Direction 122 in FIG. 1 represents tape tilt. Yet another source of error is measurement noise associated with reading of a servo track. As will be described further below, some of these other sources of error (including dynamic tape tilt) are isolated from an overall signal received by the servo read elements to enable identification of the written-in error in the servo track, so that a servo system can avoid adjusting the position of an access head due to the written-in error.

Tape tilt refers to the angle of the storage tape 102 as the storage tape passes over the access head 100. Ideally, the storage tape 102 should be traveling perpendicularly to the access head 100. However, due to manufacturing tolerances in the storage tape 102 and the tape guides of typical tape drives, the storage tape 102 may travel across the head 100 at a slight angle. This angle is known as tape tilt. Tape tilt can create positioning errors that can, for example, place the data write elements 110 slightly offset from the data tracks 108 even though the data read elements are correctly centered.

Measurement noise is a function of various different parameters and effects, with the largest effect being peak jitter. Peak jitter is primarily caused by the signal-to-noise ratio on the storage medium, which affects the timing of the detected peak of each servo track sample.

The processing circuitry 120 represents either (1) a part of a servo system that can be used in an access device (e.g., tape drive or disk drive) or (2) a part of a characterization tool (e.g., characterization software) used by an access device or storage medium manufacturer to identify various sources of errors, including built-in errors, dynamic tape tilt, and measurement noise, which can be useful during the development process of storage media or access devices. The processing circuitry 120 represents processor(s), storage device(s), and software executable on the processor(s) (if software is used).

A general flow is described in connection with FIG. 2. Reference is made to various equations below—it is noted that such equations are provided for purposes of example, as other implementations can use other types of equations. Signals from two or more sensors are received (at 150). In some embodiments, received signals from two sensors spaced apart along a direction of motion include position signals referred to as PosA and PosB, where PosA represents a first position signal received from a first sensor, and PosB represents a second position signal received from a second sensor spaced apart from the first sensor. A difference signal is then determined (at 152) based on PosA and PosB, as follows:

$$\text{Diff}(\omega_x)=\text{Pos}A-\text{Pos}B, \quad (\text{Eq. 1})$$

where the difference signal is represented as $\text{Diff}(\omega_x)$. By taking the difference of the two position signals from the two spaced apart sensors (spaced apart along the direction of motion of the storage medium), common mode effects are eliminated, where such common mode effects include lateral tape motion, head motion, and so forth. The difference between PosA and PosB, as expressed by $\text{Diff}(\omega_x)$, includes various error components, which include built-in errors, dynamic tape tilt, and measurement noise. Assuming the term $W(\omega_x)$ (a waveform, such as a sinusoidal waveform or other waveform) represents the built-in error of the storage medium, then the difference signal $\text{Diff}(\omega_x)$ can be expressed as follows:

$$\text{Diff}(\omega_x)=W(\omega_x)-W(\omega_x)\cdot e^{-S\cdot G}, \quad (\text{Eq. 2})$$

where $e^{-S\cdot G}$ is a spatial delay term representing the separation between the two spaced apart sensors that provided the PosA and PosB signals, and G represents the gap (distance) between the two sensors. From Eq. 2, the following can be derived by applying the Euler identity function that correlates complex exponentials to sine or cosine functions:

$$\text{Diff}(\omega_x)=W(\omega_x)*(1-e^{-S\cdot G})=W(\omega_x)\cdot 2\sin(\omega_x\cdot G/2)*e^{-j\omega_x\cdot G/2} \quad (\text{Eq. 3})$$

where $\omega_x$ represents spatial frequency (e.g., expressed in radians per meter). Note that this response has a sinusoidal magnitude with nulls at $\omega_x G/2=0$ and $\pi$ and a peak at $\omega_x G/2=\pi/2$.

From Eq. 3, a spatial correlation filter (SCF) can be derived, as follows:

$$\text{SCF}(j\omega_x)=\text{Diff}(\omega_x)/W(\omega_x)=1-e^{-j\omega_x\cdot G} \quad (\text{Eq. 4})$$

To map the above spatial correlation filter, SCF, expressed in the spatial domain, into the time domain, the following relationship is defined:

$$\omega=\omega_x\cdot\text{TapeVelocity}, \quad (\text{Eq. 5})$$

where TapeVelocity represents the velocity of the storage tape 102, and $\omega$ represents frequency (e.g., expressed in radians per second). It is desired to obtain the time domain digital representation, $\text{SCF}(z)$, of $\text{SCF}(j\omega_x)$. To do so, the following parameter is defined:

$$z^{-K}=e^{-j\omega/Fs\cdot K} \quad (\text{Eq. 6})$$

where K is expressed as follows:

$$K = \frac{G\cdot\omega/TapeVelocity}{\omega/Fs} = G\cdot Fs/TapeVelocity, \quad (\text{Eq. 7})$$

where Fs represents the sampling frequency (which corresponds to the frequency at which the PosA and PosB signals from the sensors are processed by the processing circuitry 120).

From the above, the digital representation of $\text{SCF}(z)$ in the time domain is as follows:

$$\text{SCF}(z)=1-z^{-K}. \quad (\text{Eq. 8})$$

Figure 2:
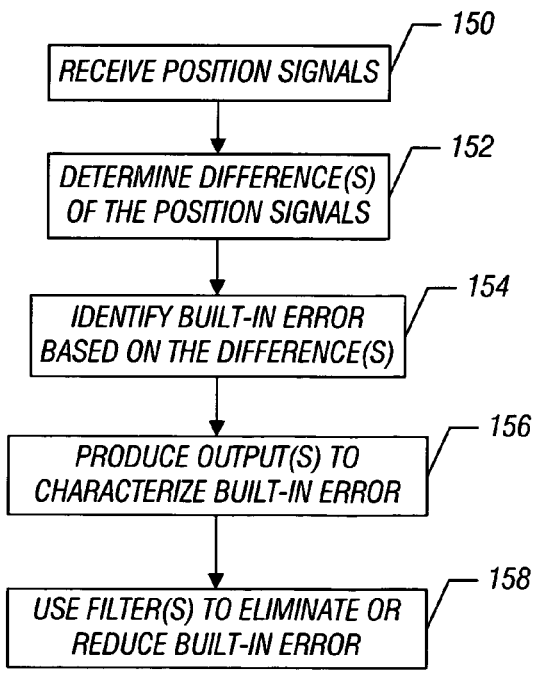
FIG. 2 is a flow diagram of a process according to an embodiment.

As further depicted in FIG. 2, from the difference signal determined at 152, built-in error can be identified (at 154). Identification of built-in error is described further below. For purposes of characterizing the built-in error, and to identify other contributing sources of error such as dynamic tape tilt and measurement noise, output(s) can be generated (at 156), such as by a characterization tool. Alternatively, for implementation in a servo system, filter(s) is (are) used (at 158) to remove effects of the built-in error, such as written-in error, when generating position error signals for adjusting positions of an access head.

Figure 3:
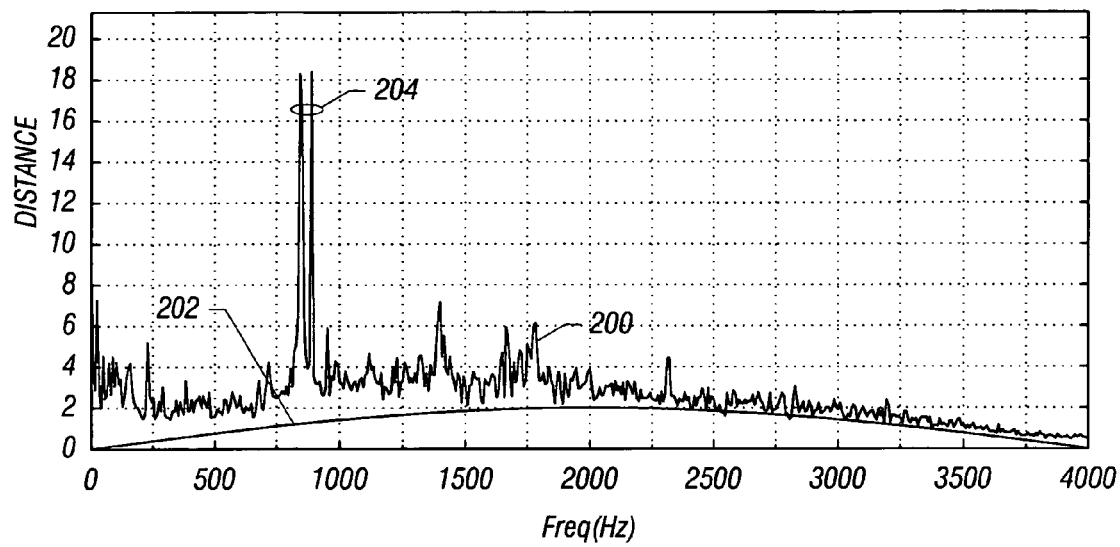
FIGS. 3-7B illustrate various output charts generated for characterizing sources of error, in accordance with an embodiment.

Example outputs generated at 156 are depicted in FIGS. 3-7B. FIG. 3 shows a frequency-domain chart that illustrates a curve 200 that represents the Diff signal in the frequency domain. FIG. 3 shows an example SCF response over a frequency span (expressed in hertz or Hz, for example) using G=1.5 mm (millimeters), Fs=8000 Hz and TapeVelocity=6 m/s (meters per second). The magnitude nulls are at frequencies 0 and $$\frac{TapeVelocity}{G} = 4000 \text{ Hz}$$

while the magnitude peak is at 2000 Hz. (Note that these example values are used for illustration purposes, as other implementations can use other values). Also depicted in FIG. 3 is a curve 202 that represents SCF in the frequency domain, which applies only to the written-in error portion of the Diff signal. Frequency domain SCF and Diff values can be readily derived from the spatial or time domain SCF and Diff values, such as by application of a fast Fourier transform (FFT). In other implementations, charts in the time domain or even in the spatial domain can be used.

As depicted in FIG. 3, the SCF curve 202 is a half sinewave function with a peak at 2,000 Hz. Effectively, the SCF curve 202 represents a scaling factor that is part of the written-in error portion of the Diff curve 200. As depicted in FIG. 3, two spikes (indicated generally by 204) occur in the Diff curve 200 at around 700-800 Hz. These spikes may correspond to built-in error, such as written-in error or other type of error. The low-frequency and high-frequency parts of the Diff curve 200 represent measurement noise and/or dynamic tape tilt, since the SCF filtering effect has already forced the written-in errors to zero at those frequencies.

Because the scaling factor represented by the SCF curve 202 modifies the actual amplitudes of the written-in error, the amplitudes of the Diff curve 200 (in the raised portion of the SCF curve 202), FIG. 3 do not accurately depict errors associated with the storage medium. To remove the effect of the scaling factor that corresponds to the SCF curve 202, and determine the true amplitudes of the written-in error, an inverse of SCF is performed. In the time domain, the inverse of SCF is expressed as follows:

$$\text{Inverse SCF(ISCF)}=1/\text{SCF}(z)=W(\omega_x)/\text{Diff}(\omega_x). \quad \text{(Eq. 9)}$$

From Eq. 9, the following equation is derived:

$$\text{ISCF}=1/(1-z^{-K}). \quad \text{(Eq. 10)}$$

Figure 4:
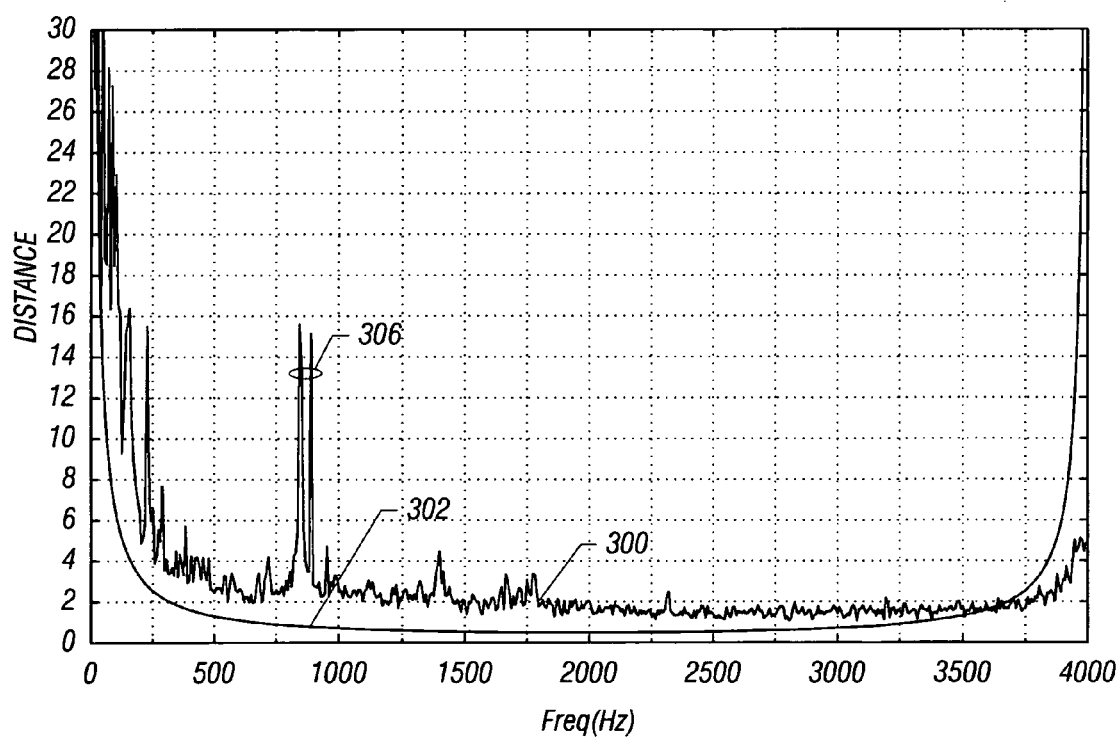

Inverse SCF (or ISCF) in the frequency domain is depicted in FIG. 4, where ISCF in the frequency domain is represented by curve 302. Note that curve 302 is the inverse of curve 202. Multiplying by ISCF properly scales the written-in portion of the signal across the frequency span. As indicated by the two spikes 306 in the Diff curve 300 of FIG. 4, the built-in error is still present in the Diff curve 300. Modifying the scaling of the Diff curve by applying the ISCF curve corrects the amplitude of the built-in error. The effect of applying ISCF can be observed in FIG. 4.

Figure 5:
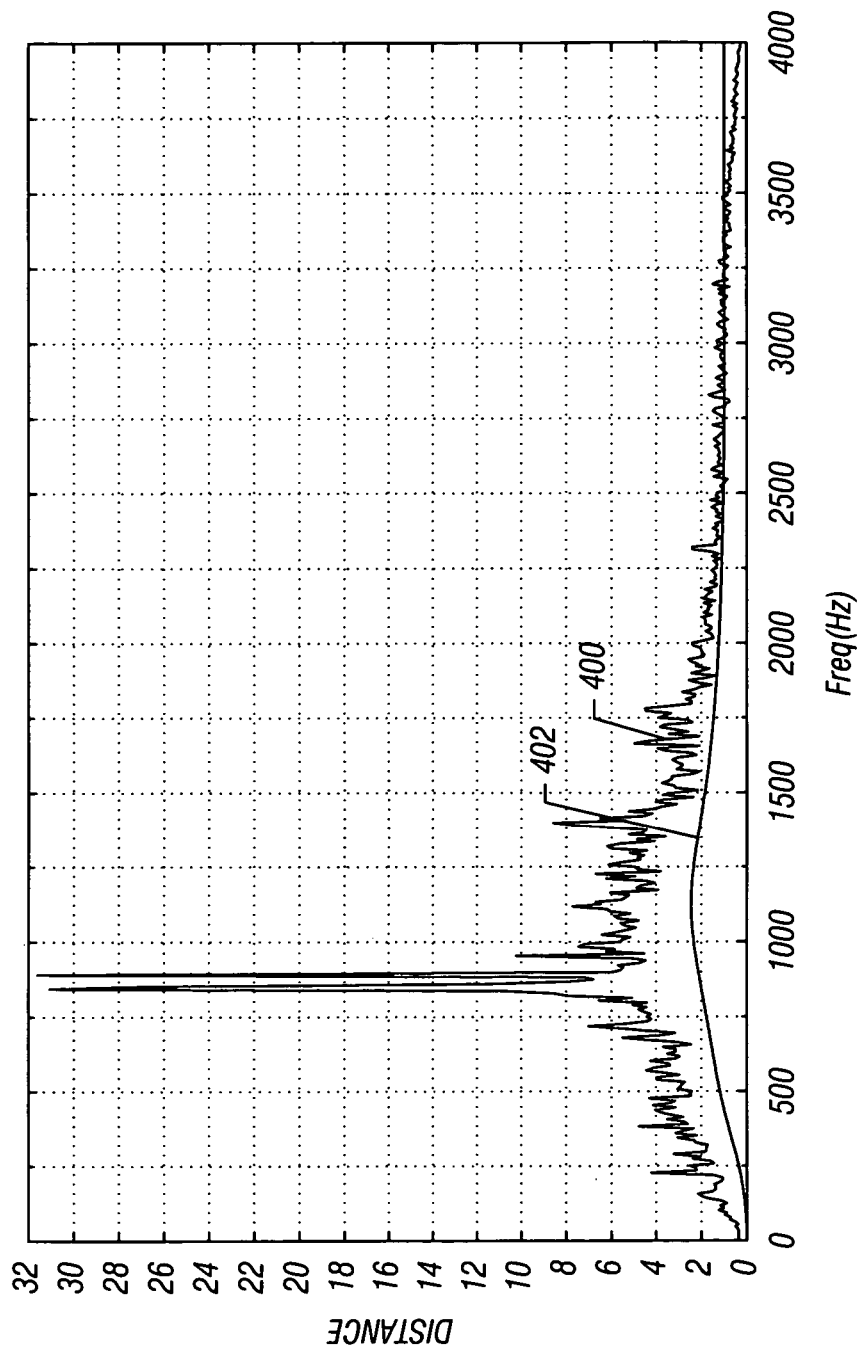

Because of the bowl-shaped profile of the curve 302, the values of ISCF close to the minimum and maximum values (0 and 4,000 Hz in the example of FIG. 4) approaches infinity. As a result, the low-frequency and high-frequency components (tape tilt and measurement noise) in the Diff curve 300 are exaggerated by the high ISCF values at low and high frequencies. To remove the exaggerated low and high frequency effects of ISCF, low and high pass filtering can be applied on the Diff curve, as depicted in FIG. 5, in which the low and high frequency portions of the Diff curve 400 have been filtered out. Also, in FIG. 5, the ISCF curve 402 now also includes contributions from the expected closed loop servo system that would be used in an actual system. This allows a user to more accurately view what the written-in error would look like in an actual system.

The charts depicted in FIGS. 4 and 5 are examples of charts that can be used by various users for the purpose of characterizing built-in errors associated with a storage medium, after eliminating lateral storage medium movement and other common mode effects. For example, a storage medium manufacturer can look at the curves to determine that written-in error is occurring at particular frequencies. Such information can be used to troubleshoot the cause of the written-in error.

Similarly, an access device manufacturer can also look at the information provided by the charts of FIGS. 4 and 5 to assist in removing effects from written-in errors when testing access devices.

Figure 6A:
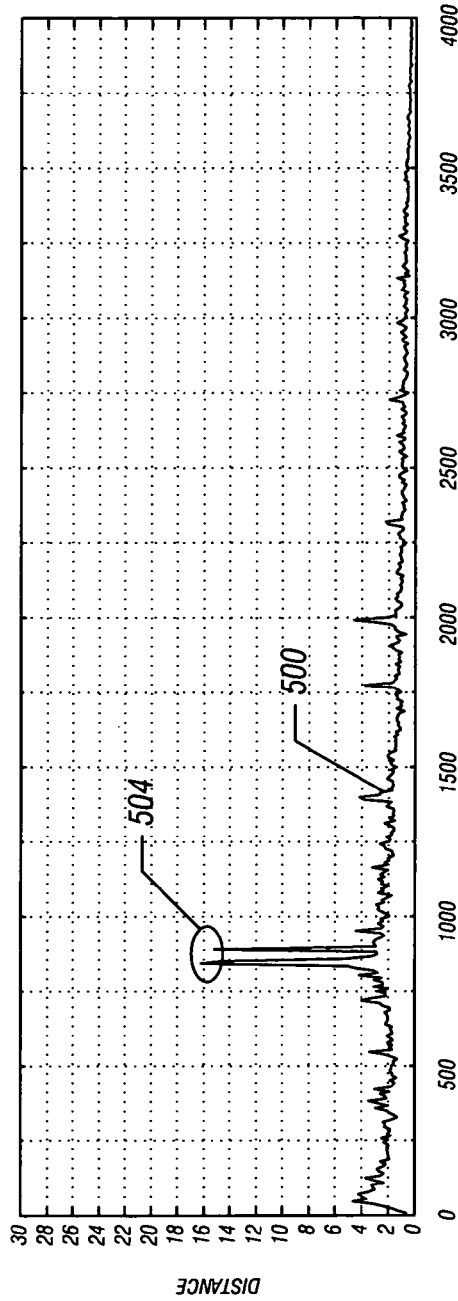
Figure 6B:
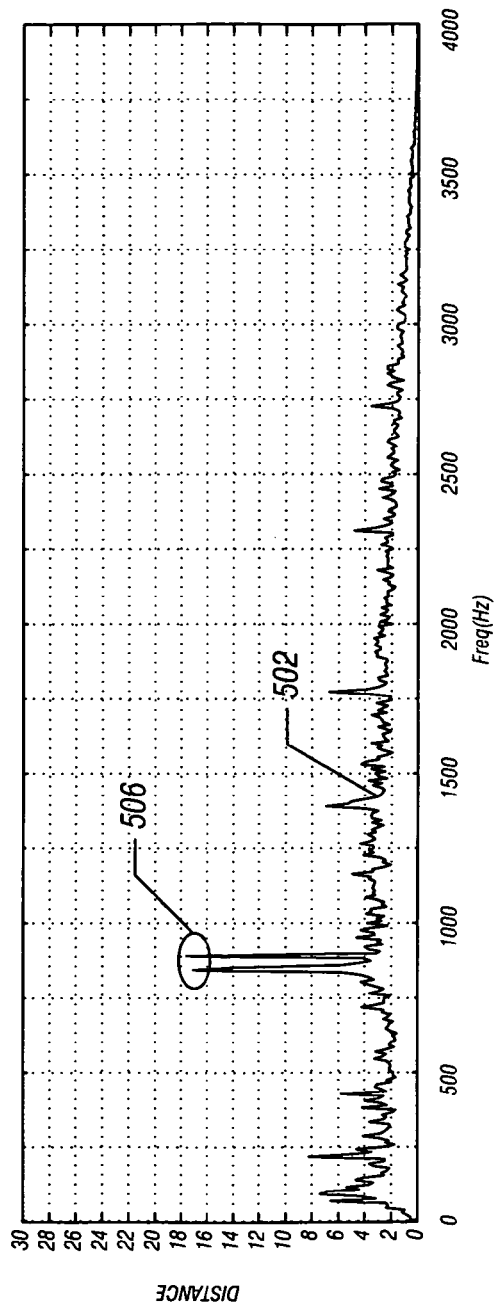

FIGS. 6A-6B are further examples of outputs that can be provided for characterization purposes. FIGS. 6A-6B illustrate curves 500 and 502, respectively, that correspond to Diff signals in the frequency domain. The curve 502 shows written-in errors (at 506) resulting from both (1) velocity variation of the storage medium during a servo write operation, and (2) lateral storage medium motion during the servo write operation. On the other hand, curve 500 shows written-in error (at 504) resulting from just velocity variation of the storage medium during the servo write operation.

Isolation of the portion of the written-in error due to storage medium velocity variation that occurs during the servo track writing process is accomplished by measuring servo patterns on a servo track that are sensitive to storage medium velocity. Typically, servo patterns include repeating groups of patterns in which each group is written simultaneously onto the storage medium. Thus, the distances between groups of patterns are subject to velocity variations. Applying the same analysis techniques to timing measurements obtained from two servo read heads spaced apart down the tape, will allow isolation of the written-in error due to velocity variation during the servo track writing process, while filtering out the common mode effect of real-time velocity variation, that occurs during the measurement.

Figure 7A:
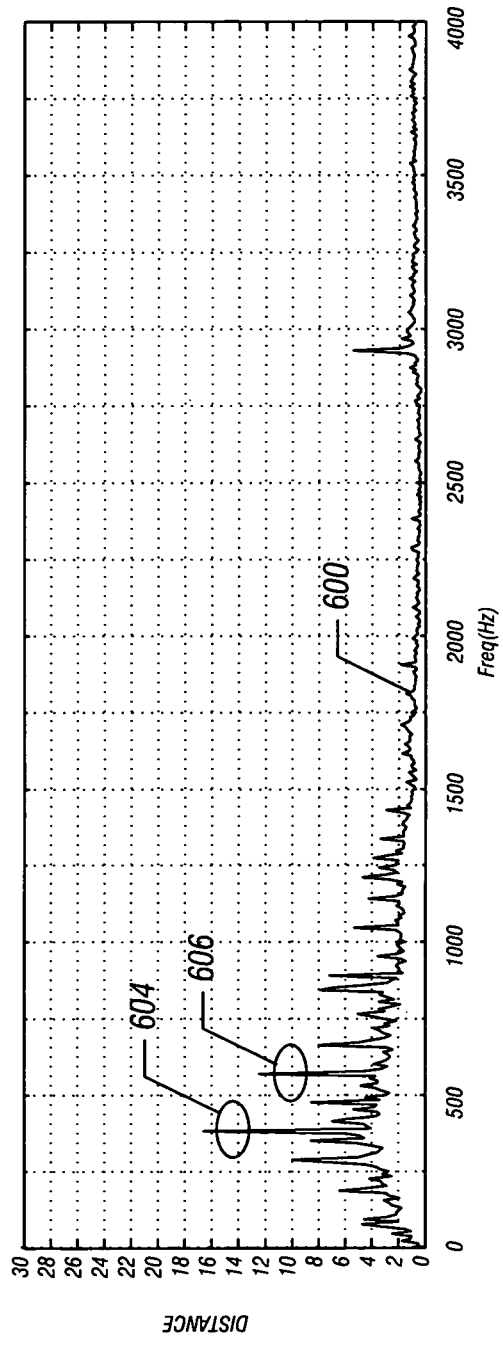
Figure 7B:
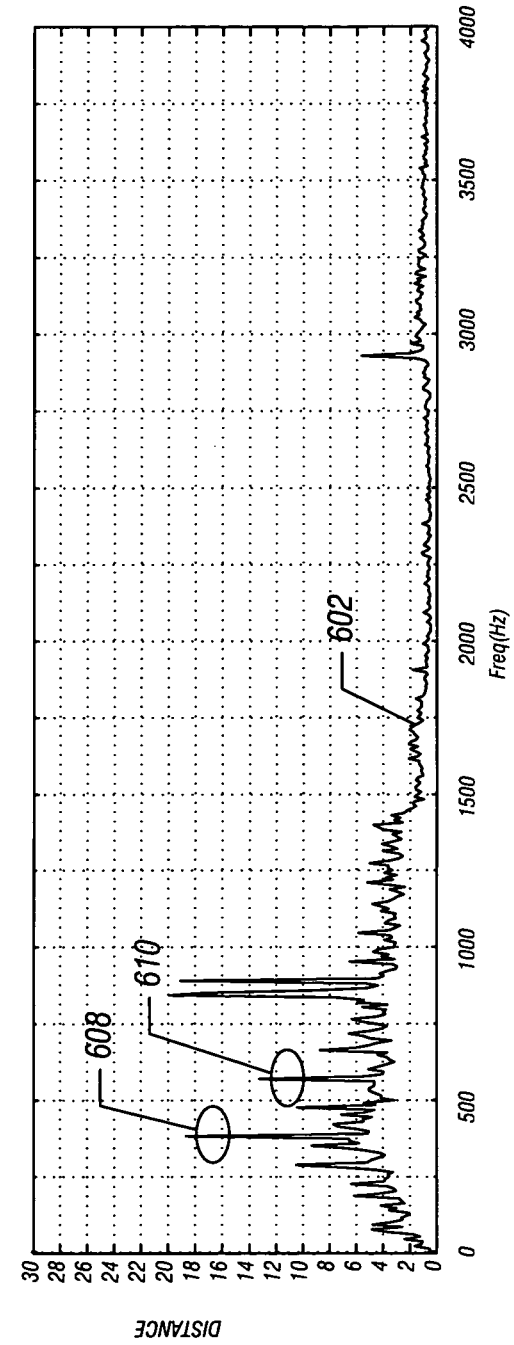

FIGS. 7A-7B illustrate additional example output charts that may be generated for characterization purposes. Curve 602 in FIG. 7B represents the average of the PosA and PosB signals, in other words (PosA+PosB)/2. Subtracting the Diff signal (such as that represented by curve 502 in FIG. 5B) from the average signal represented by curve 602 results in curve 600 in FIG. 7A, which represents the lateral tape motion of the access device. As can be seem from curve 600 in FIG. 7A, spikes 604 and 606 (which correspond to spikes 608 and 610 of curve 602) result from lateral storage medium motion (rather than from written-in error).

Note that numerous other types of charts can be generated to allow for characterization.

Figure 8:
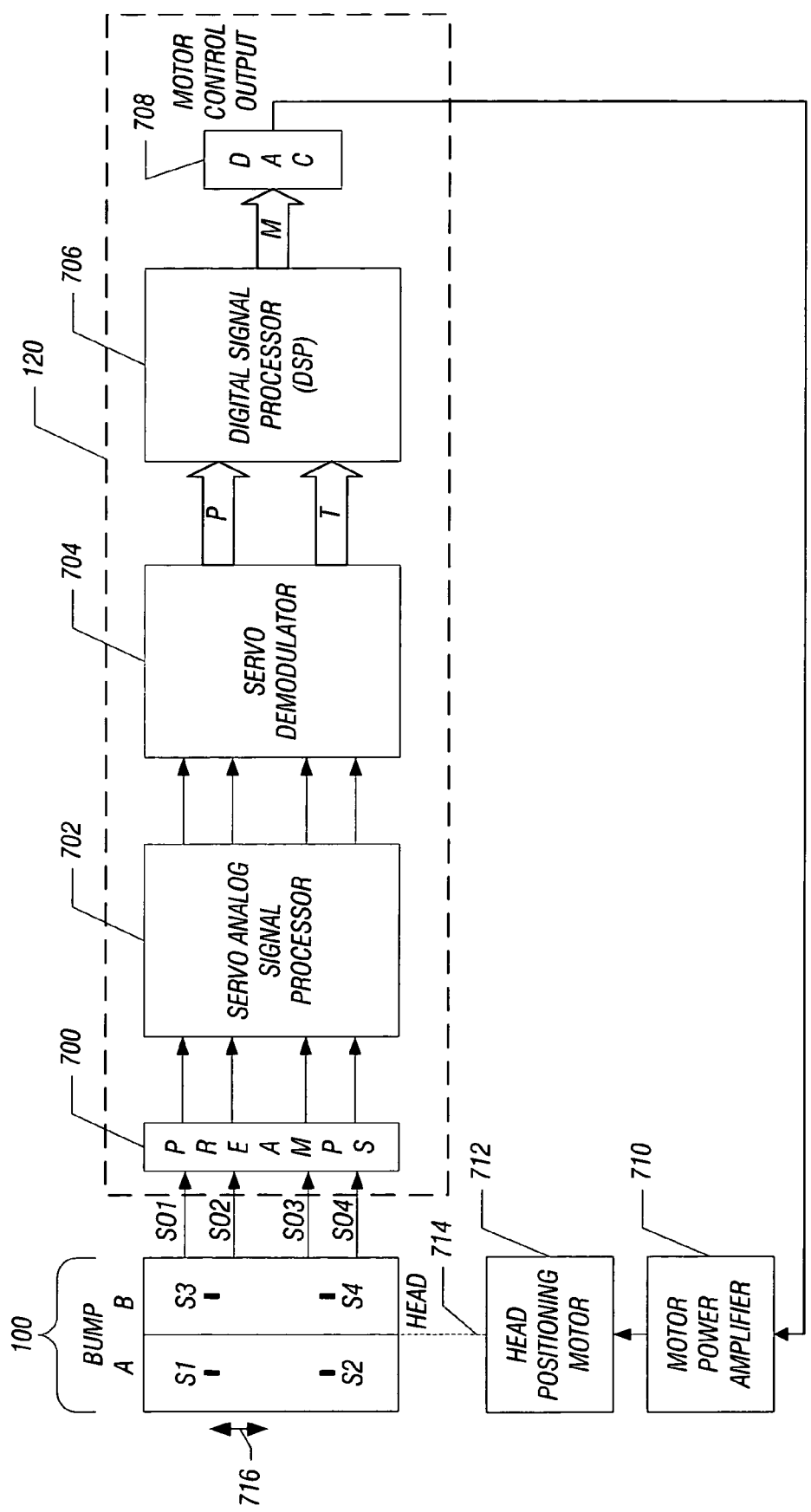
FIG. 8 is a block diagram of components of a servo system according to an embodiment.

The above has described a technique for characterizing errors that can be used by manufacturers of access devices, storage media, or by other users during the development process for storage media and/or access devices. The following describes how a servo system can be used to implement a mechanism to eliminate built-in error when producing a position error signal to adjust a position of an access head to follow only lateral storage medium movement. As depicted in FIG. 8, the four servo read elements S1-S4 provide servo head signals SO1, SO2, SO3, and SO4, respectively, to preamplifiers 700. Note that in alternative embodiments, where just two servo read elements are used (such as servo read elements S1 and S3 or S2 and S4), then just two servo head signals will be provided to the preamplifiers 700. The preamplifiers 700 are part of processing circuitry 120 (FIG. 1), which in this context is part of a servo system. The other components of the processing circuitry 120 include a servo analog signal processor 702, a servo demodulator 704, a digital signal processor (DSP) 706, and a digital-to-analog converter (DAC) 708.

The servo analog signal processor 702 performs analog gain control (AGC), filtering, and pulse detection tasks. The servo analog signal processor 702 outputs digital pulses corresponding to the servo head signals to the servo demodulator 704, which performs digital demodulation of the digital pulses received from the servo analog signal processor 702. The digital pulses are created by the servo analog signal processor 702 at points in time when peaks are detected in the waveforms received from the preamplifiers 700. The servo demodulator 704 extracts position and tape tilt information from the timing between the various pulses. Extracting the position information (P) and the tape tilt information (T) can be accomplished with various techniques. For example, to perform extraction of position information, the technique used in typical LTO tape drives can be used. To extract tape tilt information, differences in arrival times of servo frames reaching an upper and a lower servo element are measured. When the tape is running exactly horizontal, the two servo frames on the upper and lower servo tracks (such as upper and lower servo tracks 104 and 106 in FIG. 1) will arrive at the upper and lower servo read elements at precisely the same time. If the tape tilts, then there will be a difference in arrival times. The angle of the tilt can be determined by measuring the difference in arrival times. A more detailed discussion of an example technique of extracting tape tilt is described in U.S. Pat. No. 6,937,425.

The outputs of the servo demodulator 704 are provided to the DSP 706. The DSP 706 performs mathematical calculations to identify built-in error of the storage medium so that contributions from the built-in error can be eliminated from position error signals that are generated by the DSP 706. The position error signals generated by the DSP 706 are referred to as real-time position error signals, which are also used to generate motor drive output values (M) for controlling adjustments made by a head positioning motor 712. The motor drive output values (M) are provided to the digital-to-analog converter (DAC) 708, which provides an analog motor control output to a motor power amplifier 710. The motor power amplifier 710 provides its output to the head positioning motor 712, which is mechanically connected (at 714) to the access head 100. The head positioning motor 712, through the mechanical connection 714, adjusts a lateral position of the access head 100 (in the direction of arrows 716).

The servo system that is depicted in FIG. 8 is a closed loop servo system that is able to dynamically move the access head 100 to keep the access head precisely positioned in the proper location so as to reduce errors caused by built-in disturbances.

Figure 9:
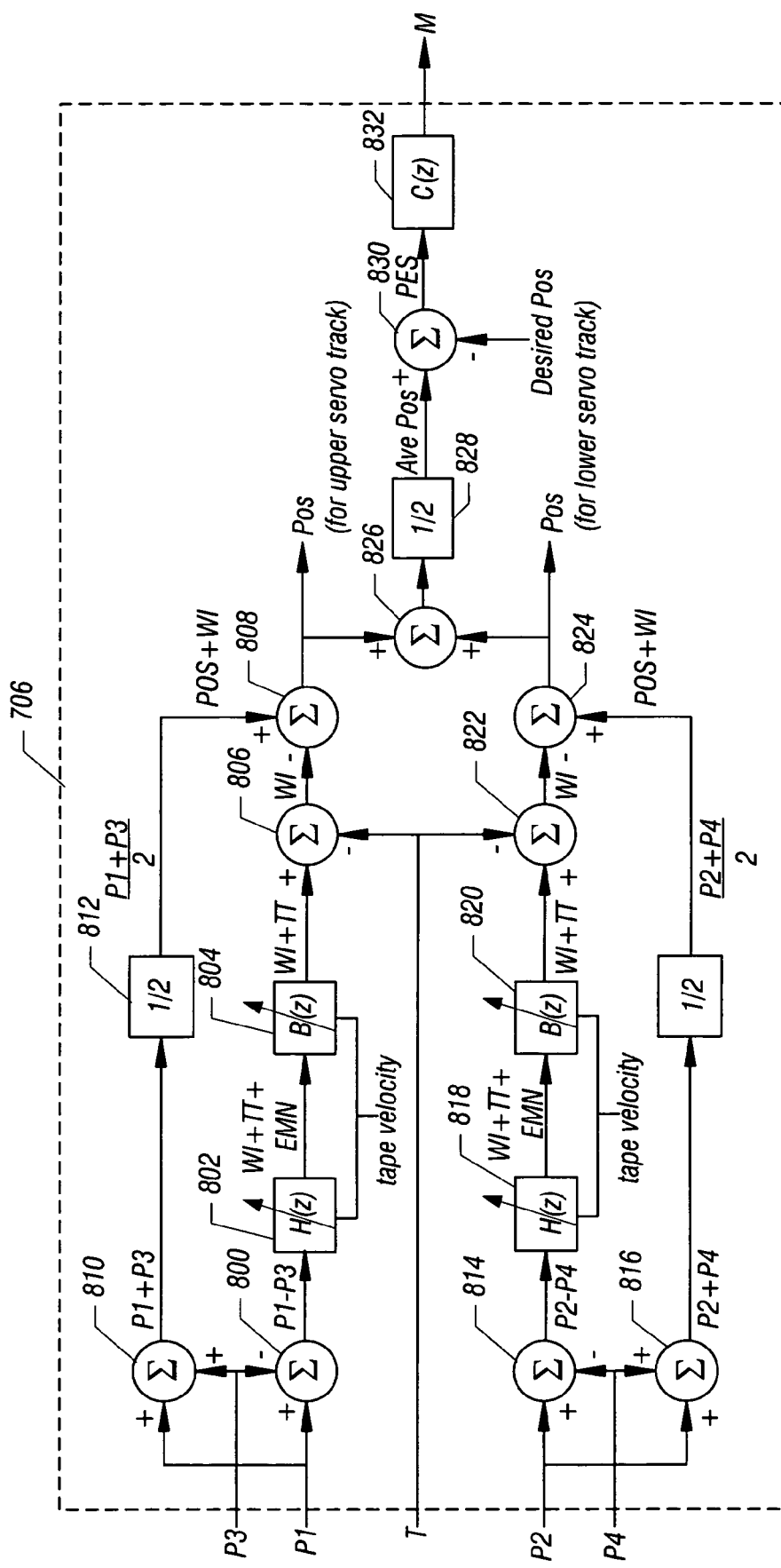
FIG. 9 is a block diagram of components in a digital signal processor used in the servo system of FIG. 8.

FIG. 9 is a signal flow block diagram that shows components in the DSP 706 to perform calculations in accordance with some embodiments. Note that the components illustrated in FIG. 9 are mathematical constructs that can be implemented with firmware (software) or alternatively with hardware.

The inputs to the DSP 706 are on the left side of the Figure. Inputs P1-P4 represent the position signals from the servo read elements S1-S4 (representing positions of servo read elements with respect to respective servo tracks). The T input is the tape tilt information from the servo demodulator 704. The inputs P1-P4 and T are dynamic and change as the storage medium moves past the access head 100. The DSP 706 samples these inputs at a rate of Fs samples per second and executes the entire set of calculations depicted in FIG. 9 for each sample. Therefore, the output M is updated Fs times per second. The output M is what controls the head positioning motor 712, and ultimately the head position itself, as discussed above.

The position signals from the two servo read elements S1 and S3 on the upper servo track are P1 and P3, respectively. The difference between P1 and P3 (P1−P3) is calculated first (by a summer 800), and the difference value is provided to a filter H(z) 802, which performs digital filtering of the difference between P1 and P3. Note that the difference P1−P3 corresponds to the Diff signal discussed above, and H(z) represents ISCF(z), as expressed by Eq. 9 above. Thus, the H(z) filter is a filter that outputs a signal containing several error components (represented by WI+TT+EMN, where WI represents written-in error, TT represents tape tilt, and EMN represents the high- and low-frequency components of the signal exaggerated by the H(z) filter).

Following the H(z) filter 802 is another filter labeled B(z) 804, where the B(z) filter 804 is a bandpass filter to remove the high- and low-frequency components EMN. Although depicted as two filters, the H(z) and B(z) filters can actually be combined as a single filter. Both the H(z) and B(z) filters 802 and 804 are adjusted by tape velocity to improve performance. The output of the B(z) bandpass filter 804 is a signal referred to as WI+TT (which includes the written-in and tape tilt components). The DSP 706 then subtracts the measured tape tilt value (T) from the WI+TT signal (with the summer 806) to subtract the measured tape tilt value (T) to obtain (identify) just the written-in value (WI) for the upper servo track. The summer 806 outputs the WI value to the negative input of a subsequent summer 808.

The positive input to the summer 808 receives an average value derived as follows. The P1 and P3 inputs are provided to a summer 810 that adds the P1 and P3 values to provide P1+P3, which is input to an averaging circuit 812 to produce (P1+P3)/2. The average of P1+P3 contains both true positioning error (Pos) and written-in error. By subtracting WI from Pos+WI at the summer 808, the DSP 706 is able to generate a more accurate positioning error (Pos) signal for the upper servo track.

Similar mathematical operations are performed by the mathematical constructs depicted in the lower half of FIG. 9 for the P2 and P4 inputs. These components that process the P2 and P4 inputs include summers 814, 816, H(z) filter 818 (which is identical to H(z) filter 802), bandpass filter 820 (identical to band pass filter 804), and summers 822 and 824 (which correspond to summers 806 and 808). The output of summer 824 provides the more accurate positioning error (Pos) for the lower servo track. The Pos for the upper servo track and the Pos of the lower servo track are summed by summer 826, with the output of the summer 826 provided to an averaging circuit 828 to produce an average true positioning error (Ave Pos), which is provided to the positive input of a summer 830. The summer 830 subtracts a Desired Pos value from the Ave Pos value to obtain a PES (position error signal) value. The Desired Pos value indicates the desired or target position of the access head 100 with respect to the storage medium (such that a data write or read head is centered on a target data track). The PES value thus represents the difference between where the access head 100 actually is located, and where the servo system wants the access head 100 to be positioned.

The PES value is input to a digital filter C(z) 832, which determines what motor control output (M) is appropriate to move the head in a direction so as to make PES go toward zero. The C(z) digital filter 832 is a servo loop compensator, which outputs the M value for controlling the head positioning motor 712 depicted in FIG. 8.

The processes and techniques described above in connection with FIGS. 2-9 can be implemented with hardware, software, or a combination of hardware and software. Instructions of software (such as software to implement the characterizing tool or software to implement portions of the servo system, if applicable) are loaded for execution on a processor. The processor includes digital signal processors, microprocessors, microcontrollers, processor modules or subsystems (including one or more microprocessors or microcontrollers), or other control or computing devices.

Data and instructions (of the software) are stored in respective storage devices, which are implemented as one or more computer-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   measuring position signals by at least two spaced apart servo read elements that read servo information on a servo track of a storage medium;
   determining a difference of the position signals;
   identifying built-in error of the storage medium associated with the servo track of the storage medium based on the difference, wherein the built-in error comprises noise written into the servo track during a servo write operation; and
   identifying measurement noise associated with reading the servo data.

2. The method of claim 1, wherein identifying the built-in error comprises identifying noise written into the servo track due to velocity variation or relative lateral movement between the storage medium and a servo write element.

3. The method of claim 1, further comprising identifying dynamic tape tilt of the storage medium.

4. The method of claim 1, further comprising removing an effect of the built-in error by a servo system to generate a signal for adjusting a position of an access head with respect to the storage medium.

5. A method comprising:
   measuring position signals by at least two spaced apart servo read elements that read servo information on a servo track of a storage medium;
   determining a difference of the position signals;
   identifying built-in error of the storage medium associated with the servo track of the storage medium based on the difference, wherein the built-in error comprises noise written into the servo track during a servo write operation and wherein identifying the built-in error is based on a displayed curve generated based on the difference of the position signals; and
   identifying measurement noise associated with reading the servo data.

6. The method of claim 5, wherein identifying the built-in error based on the displayed curve is based on the displayed curve across a frequency span.

7. A method comprising:
   measuring position signals by at least two spaced apart servo read elements that read servo information on a servo track of a storage medium;
   determining a difference of the position signals;
   identifying built-in error of the storage medium associated with the servo track of the storage medium based on the difference;
   generating a curve representing the difference in a frequency domain; and
   determining a scaling factor of a signal represented by the curve.

8. The method of claim 7, further comprising inverting the scaling factor to correct an amplitude of the built-in error.

9. A method comprising:
   measuring position signals by at least two spaced apart servo read elements that read servo information on a servo track of a storage medium;
   determining a difference of the position signals;
   identifying built-in error of the storage medium associated with the servo track of the storage medium based on the difference;
   removing an effect of the built-in error by a servo system to generate a signal for adjusting a position of an access head with respect to the storage medium; and
   providing a first filter, the first filter to receive a difference signal representing the difference of the position signals and to output a first signal containing the built-in error and at least one other error component.

10. The method of claim 9, further comprising removing the at least one other error component from the first signal to provide a second signal representing the built-in error, wherein identifying the built-in error comprises providing the second signal.

11. The method of claim 10, wherein removing the at least one other error component from the first signal comprises removing a dynamic tape tilt component.

12. The method of claim 9, further comprising providing a second filter to receive the first signal, the second filter to remove the at least one other error component, the at least one other error component comprising components of the first signal exaggerated by the first filter.

13. The method of claim 12, wherein providing the first and second filters comprises providing the first and second filters that are combined in a single filter.

14. An apparatus comprising:
    at least first and second spaced apart sensors arranged along a direction of motion of a medium, the at least first and second sensors spaced apart along the direction of motion of the medium; and
    a processing circuit to:
       receive a first signal from the first sensor and a second signal from the second sensor;
       determine a difference of the first and second signals; and
       identify, based on the difference, an error written into a servo track of the medium during a servo write operation.

15. The apparatus of claim 14, wherein the medium comprises a storage medium, and wherein the sensors comprise servo read elements to read servo information in the servo track of the storage medium.

16. The apparatus of claim 15, wherein the error written into the servo track of the storage medium comprises error written into the servo track of the storage medium due to velocity variation during the servo write operation.

17. The apparatus of claim 15, wherein the error written into the servo track of the storage medium comprises error written into the servo track due to relative lateral movement of a servo write element and storage medium during the servo write operation.

18. The apparatus of claim 14, wherein the sensors are adapted to detect an edge profile of the medium.

19. The apparatus of claim 14, wherein the processing circuit comprises a characterization tool to further produce at least one output representing the error built into the medium.

20. The apparatus of claim 19, wherein the at least one output further represents other contributing sources of errors associated with the medium.

21. An article comprising at least one storage device containing instructions that when executed cause a system to:
  receive signals from plural spaced apart sensors arranged along a direction of motion of a medium, wherein the signals represent servo information of the medium;
  determine a difference of the signals;
  identify an error built into the medium based on the difference;
  identify measurement noise associated with the signals; and
  provide a filter that receives a difference signal representing a difference of the signals received from the plural spaced apart sensors, and that outputs an output signal containing the error built into the medium and at least one other error component.

22. The article of claim 21, wherein the at least one other error component is from at least one other contributing source of error associated with the medium.

23. The article of claim 21, wherein identifying the error built into the medium comprises identifying a physical artifact of the medium.

24. The article of claim 21, wherein the medium comprises a storage medium, and wherein identifying the error built into the medium comprises identifying an error written into a servo track of the storage medium.

25. A method comprising:
  measuring position signals by at least two spaced apart servo read elements that read servo information on a servo track of a storage medium;
  determining a difference of the position signals;
  identifying built-in error of the storage medium associated with the servo track of the storage medium based on the difference, wherein the built-in error comprises noise written into the servo track during a servo write operation;
  identifying measurement noise associated with reading the servo data; and
  providing a filter that receives a difference signal representing the difference of the position signals and that outputs an output signal containing the built-in error and at least one other error component.

* * * * *